(12) United States Patent
Andresen et al.

(10) Patent No.: US 8,500,320 B2
(45) Date of Patent: Aug. 6, 2013

(54) LOW SHEAR GAS MIXER

(75) Inventors: Harvey E. Andresen, Luling, LA (US); Christopher P. Christenson, Lake Jackson, TX (US); Charles W. Lipp, Lake Jackson, TX (US); John R. Mayer, The Woodlands, TX (US); Thomas J. Kling, Midland, MI (US); Victor R. Fey, West Bloomfield, MI (US); Laurence G. Britton, Charleston, WV (US); Michael J. Rangitsch, Saginaw, MI (US); Michael L. Hutchison, Poca, WV (US); Matthias Schaefer, Saxony (DE)

(73) Assignee: Dow Technology Investments LLC, Midland, MI (US)

( * ) Notice: Subject to any disclaimer, the term of this patent is extended or adjusted under 35 U.S.C. 154(b) by 161 days.

(21) Appl. No.: 12/678,257

(22) PCT Filed: Nov. 12, 2008

(86) PCT No.: PCT/US2008/012716
§ 371 (c)(1),
(2), (4) Date: Mar. 15, 2010

(87) PCT Pub. No.: WO2009/102311
PCT Pub. Date: Aug. 20, 2009

(65) Prior Publication Data
US 2010/0307337 A1 Dec. 9, 2010

Related U.S. Application Data

(60) Provisional application No. 61/007,670, filed on Dec. 14, 2007.

(51) Int. Cl.
*B01F 3/02* (2006.01)

(52) U.S. Cl.
USPC ............ 366/177.1; 95/216; 96/356; 239/432; 239/590.3; 366/336; 366/337; 422/224

(58) Field of Classification Search
USPC ................... 95/149, 216, 273; 96/243, 356; 55/462; 366/177.1, 181.6, 341, 337, 336; 239/590.3, 432; 422/224, 225
See application file for complete search history.

(56) References Cited

U.S. PATENT DOCUMENTS 2,614,616 A 10/1952 Villoresi et al.
2,981,747 A 4/1961 Lang et al.
(Continued)

FOREIGN PATENT DOCUMENTS

DE 102005020942 11/2006
EP 0006734 1/1980
(Continued)

OTHER PUBLICATIONS

U.S. Appl. No. 12/678,263, Wet Scrubbing for Removing Particulate Solids From Oxygen Supply Line, filed Mar. 15, 2010.
(Continued)

*Primary Examiner* — Duane Smith
(74) *Attorney, Agent, or Firm* — McDonnell Boehnen Hulbert & Berghoff LLP

(57) ABSTRACT

A gas mixer (10) for mixing a first gas stream with a second gas stream includes an impact labyrinth (24) in the first gas stream having structures (25), e.g., corrugated walls, forming a tortuous path through which the first gas stream must pass en route to a mixing point (20) in the gas mixer. The labyrinth fosters ignition of particles entrained in the first gas stream. Elongate, straight pipes (30) receive the first gas stream from the impact labyrinth (24) and carrying the first gas stream to the mixing point (20) the pipes (30) are positioned with a vessel (12) carrying the second gas stream. The pipes (30) have openings which are substantially aligned with the flow direction of the second gas stream at the mixing point (20) thereby introducing the first gas stream into the second gas stream in a low shear manner.

19 Claims, 3 Drawing Sheets

U.S. PATENT DOCUMENTS

| | | | |
|---|---|---|---|
| 2,998,465 A | | 8/1961 | Drummond et al. |
| 3,081,818 A | | 3/1963 | Braconier et al. |
| 3,237,923 A | | 3/1966 | Turner |
| 3,518,284 A | | 6/1970 | Foster |
| 3,570,471 A | | 3/1971 | Lazaridis |
| 3,702,619 A | | 11/1972 | Son |
| 3,706,534 A | * | 12/1972 | Verheul et al. ............. 239/590.3 |
| 4,012,469 A | | 3/1977 | Accortt |
| 4,256,604 A | | 3/1981 | Aida et al. |
| 4,348,476 A | | 9/1982 | Hou |
| 4,390,346 A | | 6/1983 | Cramer et al. |
| 4,393,817 A | | 7/1983 | Lindberg |
| 4,415,508 A | | 11/1983 | Aida et al. |
| 4,564,298 A | | 1/1986 | Gritters et al. |
| 4,573,803 A | | 3/1986 | Gritters et al. |
| 4,634,459 A | * | 1/1987 | Pischinger et al. ............. 55/418 |
| 4,926,620 A | * | 5/1990 | Donle ............................. 95/202 |
| 5,037,619 A | | 8/1991 | Alagy et al. |
| 5,178,654 A | | 1/1993 | Cowley et al. |
| 5,250,267 A | | 10/1993 | Johnson et al. |
| 5,328,359 A | * | 7/1994 | Retallick ........................ 431/326 |
| 5,336,791 A | | 8/1994 | Jennings et al. |
| 6,231,648 B1 | * | 5/2001 | Marlowe ......................... 96/243 |
| 6,657,079 B1 | | 12/2003 | Mitsumoto et al. |
| 6,713,036 B1 | | 3/2004 | Vanden Bussche et al. |
| 6,840,256 B1 | | 1/2005 | Ryan et al. |
| 6,953,495 B2 | | 10/2005 | Schwab |
| 7,108,838 B2 | | 9/2006 | McGee |
| 2003/0021182 A1 | | 1/2003 | Illy et al. |
| 2003/0175183 A1 | | 9/2003 | Guetlhuber |
| 2004/0062689 A1 | | 4/2004 | Gauthier et al. |
| 2006/0036106 A1 | | 2/2006 | Mazanec et al. |
| 2006/0231645 A1 | | 10/2006 | Chan |

FOREIGN PATENT DOCUMENTS

| | | |
|---|---|---|
| EP | 0026827 | 4/1981 |
| EP | 1705167 | 9/2006 |
| EP | 1726355 | 11/2006 |
| GB | 672446 | 5/1952 |
| GB | 705176 | 3/1954 |
| GB | 1262436 | 2/1972 |
| GB | 1368922 | 10/1974 |
| GB | 2009174 | 6/1979 |
| GB | 2357318 | 6/2001 |
| JP | 55061927 A | 5/1985 |
| JP | 55064579 A | 5/1985 |
| TW | 590803 | 6/2004 |
| WO | WO01/85873 | 11/2001 |
| WO | WO2007/045457 | 4/2007 |
| WO | WO2009/078897 | 6/2009 |
| WO | WO2009/078898 | 6/2009 |
| WO | WO2009/078899 | 6/2009 |
| WO | WO2009/078900 | 6/2009 |

OTHER PUBLICATIONS

U.S. Appl. No. 12/678,270, Oxygen/Hydrocarbon Rapid (High Shear) Gas Mixer, Particularly for the Production of Ethylene Oxide, filed Mar. 15, 2010.
U.S. Appl. No. 12/678,274, Hydrocarbon/Oxygen Industrial Gas Mixer With Water Mist, filed Mar. 15, 2010.
U.S. Appl. No. 12/678,276, Hydrocarbon/Oxygen Industrial Gas Mixer With Coarse Water Droplet Environment to Reduce Ignition Potential, filed Mar. 15, 2010.
PCT International Search Report, PCT International Application No. PCT/US2008/012587, mailed Feb. 10, 2009.
PCT International Search Report, PCT International Application No. PCT/US2008/012716, mailed Oct. 5, 2009.
PCT International Search Report, PCT International Application No. PCT/US2008/012715, mailed Feb. 3, 2009.
PCT International Search Report, PCT International Application No. PCT/US2008/012714, mailed Mar. 10, 2009.
PCT International Search Report, PCT International Application No. PCT/US2008/012586, mailed Feb. 11, 2009.
PCT Written Opinion, PCT International Application No. PCT/US2008/012587, mailed Feb. 10, 2009.
PCT Written Opinion, PCT International Application No. PCT/US2008/012716, mailed Oct. 5, 2009.
PCT Written Opinion, PCT International Application No. PCT/US2008/012715, mailed Nov. 19, 2009.
PCT Written Opinion, PCT International Application No. PCT/US2008/012714, mailed Mar. 10, 2009.
PCT Written Opinion, PCT International Application No. PCT/US2008/012586 mailed Feb. 11, 2009.
PCT International Preliminary Report on Patentability, PCT International Application No. PCT/US2008/012587, mailed Feb. 22, 2010.
PCT International Preliminary Report on Patentability, PCT International Application No. PCT/US2008/012586, mailed Feb. 22, 2010.
PCT International Preliminary Report on Patentability, PCT International Application No. PCT/US2008/012715, mailed Mar. 29, 2010.
PCT International Preliminary Report on Patentability, PCT International Application No. PCT/US2008/012716, mailed Jun. 24, 2010.
PCT International Preliminary Report on Patentability, PCT International Application No. PCT/US2008/012714, mailed Jun. 24, 2010.
Burkholz, Armin, "Droplet Separation", 1989, pp. 180-182, VCH Publishers, New York, NY.
U.S. Appl. No. 12/678,270, Office Action mailed Jul. 12, 2012.
U.S. Appl. No. 12/678,274, Office Action mailed Jul. 16, 2012.
U.S. Appl. No. 12/678,276, Office Action mailed May 15, 2012.
Mawhinney et al., Halon Options Technical Working Conference, Protecting Against Vapor Explosions With Water Mist, 215-226, May 2-4, 2000.

* cited by examiner

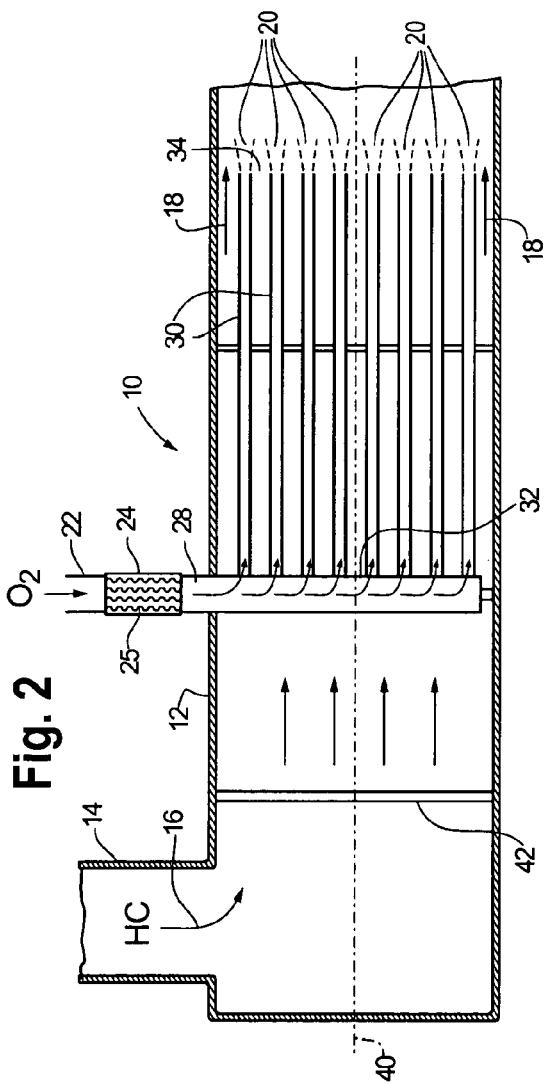
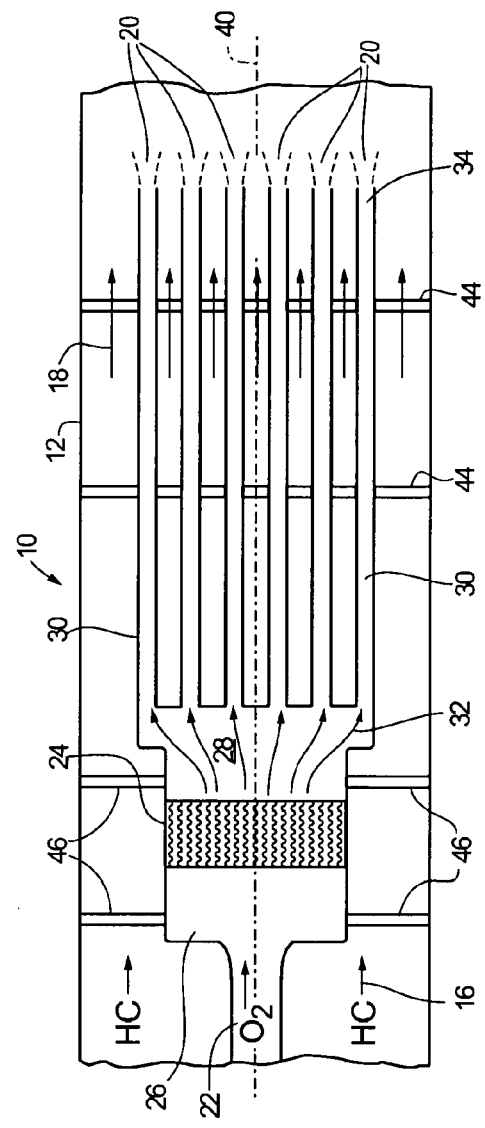

LOW SHEAR GAS MIXER

CROSS-REFERENCE TO RELATED APPLICATIONS

This application is a U.S. National Phase of International Application No. PCT/US2008/012716, filed Nov. 12, 2008, which claims priority to U.S. Provisional Application No. 61/007,670, filed Dec. 14, 2007, all of which are herein incorporated by reference in their entirety.

BACKGROUND

This invention relates generally to a gas mixer for mixing two gas streams. The disclosure is particularly suited to a gas mixer for mixing a hydrocarbon-containing gas stream with an oxygen-containing gas stream. The disclosure features a design of a gas mixer which minimizes the potential for ignition of the two gases in the mixer. An example of where this invention has utility is gas mixers used in the industrial production of ethylene oxide.

The chemical compound ethylene oxide (chemical formula $C_2H_4O$) is an important industrial chemical used as an intermediate in the production of ethylene glycol (the main component of automotive antifreeze) and other chemicals. Ethylene oxide is also used as a sterilant for foods and medical supplies. It is a colorless flammable gas at room temperature, and can be cooled and stored as a liquid.

Ethylene oxide first achieved industrial importance during World War I as a precursor to both ethylene glycol and the chemical weapon mustard gas. In 1931, Theodore Lefort, a French chemist, discovered a means to prepare ethylene oxide directly from ethylene and oxygen, using silver as a catalyst. Since 1940, almost all ethylene oxide produced industrially has been made using this method.

In current industrial processes, ethylene oxide is produced when ethylene ($CH_2$=$CH_2$) and oxygen ($O_2$) react on a silver catalyst at 200-300° C. showing large Ag nanoparticles supported on Alumina. Typically, chemical modifiers such as chlorine are also included. Pressures used are in the region of 1-2 MPa. The chemical equation for this reaction is:

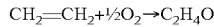

$$CH_2=CH_2 + \tfrac{1}{2}O_2 \rightarrow C_2H_4O$$

In ethylene oxide production systems, a gas mixer is used to mix the hydrocarbon and oxygen gas streams just upstream of the reaction chamber where the silver catalyst is present. The gas mixer is typically constructed in the form of a vessel or pipe. The vessel includes an inlet manifold for each of the two gases. The vessel is sometimes constructed with a main outer pipe containing the hydrocarbon-containing gas stream and internal concentric tubes or "fingers" which contain the oxygen stream. Mixing occurs at the point where the internal tubes end, where the oxygen gas flowing out of the fingers meets the main stream of hydrocarbon-containing gas flowing in the outer tube. This basic design is described in U.S. Pat. No. 3,706,534.

The art has long recognized that there is a risk of ignition of a hydrocarbon-containing gas stream (e.g., a stream of gas containing for example ethylene mixed with other hydrocarbon gases) at the point where it is combined with an oxygen gas in a gas mixer. Ignition can occur when a particle (e.g. a piece of sand, rust or pipe scale) entrained in the hydrocarbon or oxygen gas stream strikes a metallic surface in the mixer, e.g., the wall of the mixer, thereby producing a spark. If the spark occurs in the hydrocarbon stream in the highly flammable zone e.g., at, or close to, the point of mixing of the two gas streams, ignition can occur. The ignition damages the gas mixer and also requires an interrupt of production to suppress the ignition and allow the gas mixer to cool before recommencing production. The flammable region is confined to the mixing zone of the two gases. The hydrocarbon-containing gas as well as the reactor feed blend are below the lower $O_2$ flammability limit—i.e., too rich to burn.

The art has devised a variety of gas mixer designs. Some of the designs are specifically directed to reducing the risk of ignition of hydrocarbon and oxygen gas stream. The known prior art includes the following patent documents, in addition to the above-cited '534 patent: U.S. Pat. No. 4,573,803; U.S. Pat. No. 3,702,619; U.S. Pat. No. 4,256,604; U.S. Pat. No. 4,415,508; U.S. Pat. No. 6,657,079; U.S. 2003/0021182; U.S. Pat. No. 3,518,284; U.S. Pat. No. 4,390,346; U.S. Pat. No. 3,237,923; U.S. Pat. No. 3,081,818; U.S. Pat. No. 2,614,616 and U.S. Pat. No. 6,840,256.

SUMMARY

The present disclosure provides for a gas mixer which is designed for mixing two gas streams, e.g., a hydrocarbon-containing gas stream and an oxygen-containing gas stream, for example in the production of ethylene oxide. The gas mixer includes several features designed to reduce the potential of ignition events in the gas mixer. The present disclosure achieves this result through a low-shear mixing design utilizing a multiplicity of long, parallel, oxygen injection pipes placed within a vessel or pipe carrying the hydrocarbon-containing gas. The oxygen pipes are oriented such that their openings are substantially coaxially aligned with the flow direction of the hydrocarbon-containing gas stream at the mixing point. The coaxial gas flow path in the oxygen injection pipes minimizes the frequency and energy of particle impacts with the internal pipe walls, so that incandescent particles are not generated shortly upstream of the mixing point where the combined mixed gases are potentially ignitable. The low-shear design, due to coaxial flow at the mixing point, also minimizes the relative velocity of oxygen with respect to hydrocarbon-containing gas within the mixing plume and hence the likelihood of breaking up larger particles entrained within the hydrocarbon-containing gas stream. An additional potential source of incandescent particles is breakup of larger particles such as corrosion-derived flakes present in the hydrocarbon-containing gas stream. This breakup is minimized by the low shear design of the oxygen pipes. The occurrence of particles in the hydrocarbon-containing gas stream is preferably minimized in the first instance by using corrosion-resistant materials for the pipes carrying the hydrocarbon gas.

Unless they are fully oxidized, metal-containing particles entrained in the oxygen feed are most hazardous since impact with surfaces in oxygen at elevated pressure can result in ignition of the particles. If the particles are sufficiently hot when they arrive at the mixing zone, this can result in ignition of the ignitable region of the mixing plume. The likelihood of producing such an incandescent or hot particle increases as impact energy increases. However, typical particles are sufficiently small to burn and cool safely if particle ignition occurs sufficiently far upstream of the mixing zone. Apart from minimizing the production of such particles in the first place, the present inventors have appreciated that it is desirable to actually foster particle impact and burning in the oxygen gas stream upstream of the mixing zone, and sufficiently far upstream such that any particles surviving impact and ignition have cooled sufficiently such that when they are introduced with the hydrocarbon-containing gas at the mixing point ignition will not occur.

Thus, in another aspect of this disclosure, the gas mixer of this disclosure includes the use of a labyrinth in the oxygen gas stream which includes structures (e.g., an array of closely spaced corrugated walls) defining a tortuous path through which the oxygen-containing gas stream must flow upstream of the oxygen pipes in the gas mixer. The wall structures of the labyrinth are designed to foster or promote impacts and burning of particles (e.g., rust or scale) entrained in the oxygen gas stream. The labyrinth maximizes the probability of particle impact far upstream of the ignitable mixing zone and burning up of the particle. The feature of incorporation of the labyrinth into a gas stream is preferably used in conjunction with the use of long oxygen injection tubes to maximize the time available for these particles to safely cool after striking the walls of the labyrinth.

The principles of the present disclosure can be used either alone or in combination with additional safeguards for minimizing the number and size of particles entering the gas mixer from the oxygen feed system. For example, the features of this design can be incorporated into a system which includes a subsystem upstream of the gas mixer and labyrinth, such as filter or wet scrubber, to remove particles from the oxygen gas stream, or to filter the gas stream such that any particles entering the gas mixer are sufficiently small to burn and cool upstream of the gas mixing zone, i.e., within the labyrinth.

In one particular aspect of this disclosure, a gas mixer is disclosed for mixing a first gas stream (e.g., an oxygen-containing gas stream) with a second gas stream (e.g., hydrocarbon-containing gas) at a mixing point within the gas mixer. The gas mixer features a) an impact labyrinth in the first gas stream, the impact labyrinth comprising structures forming a tortuous path through which the first gas stream must pass en route to the mixing point, the impact labyrinth fostering ignition of particles entrained in the first gas stream; b) a plurality of elongate pipes each having an opening, the plurality of pipes receiving the first gas stream from the impact labyrinth and carrying the first gas stream to the mixing point, and c) a vessel carrying the second gas stream, the second gas stream having a flow direction, wherein the plurality of pipes are positioned within the vessel and the openings of the pipes are substantially coaxially aligned with the flow direction of the second gas stream at the mixing point.

In another aspect, the labyrinth feature of this disclosure can be retrofit into existing gas mixers. Thus, in this aspect an improvement to a gas mixer for mixing an oxygen gas stream with a hydrocarbon-containing gas stream is disclosed, the improvement being providing an impact labyrinth with the gas mixer, the impact labyrinth having an inlet receiving the oxygen gas stream and structures forming a tortuous path through which the oxygen gas stream must pass and an outlet. The gas mixer includes pipes supplying the oxygen gas to a mixing point where the two gas streams mix in the gas mixer. The structures forming the tortuous path in the labyrinth foster ignition of particles entrained in the oxygen gas stream.

In still another aspect, a method is disclosed of mixing a hydrocarbon-containing gas stream with an oxygen-containing gas stream, comprising the steps of: supplying the oxygen gas stream to an impact labyrinth comprising structures forming a tortuous path through which the oxygen gas stream must pass; flowing the oxygen gas stream through the labyrinth; directing the oxygen gas stream from the labyrinth into a plurality of pipes; and directing the oxygen gas stream out of the pipes into the hydrocarbon-containing gas stream at a mixing point within a gas mixer.

A primary application of this invention is in the direct oxidation ethylene oxide process, but the invention may be employed for other applications where pressurized oxygen is mixed into hydrocarbon streams where a potential ignition hazard exists.

BRIEF DESCRIPTION OF THE DRAWINGS

FIG. 2 is a schematic representation of an alternative embodiment of the gas mixer of FIG. 1.

FIG. 3 is a schematic representation of alternative embodiment of the gas mixer of FIGS. 1 and 2.

DETAILED DESCRIPTION

Figure 1:
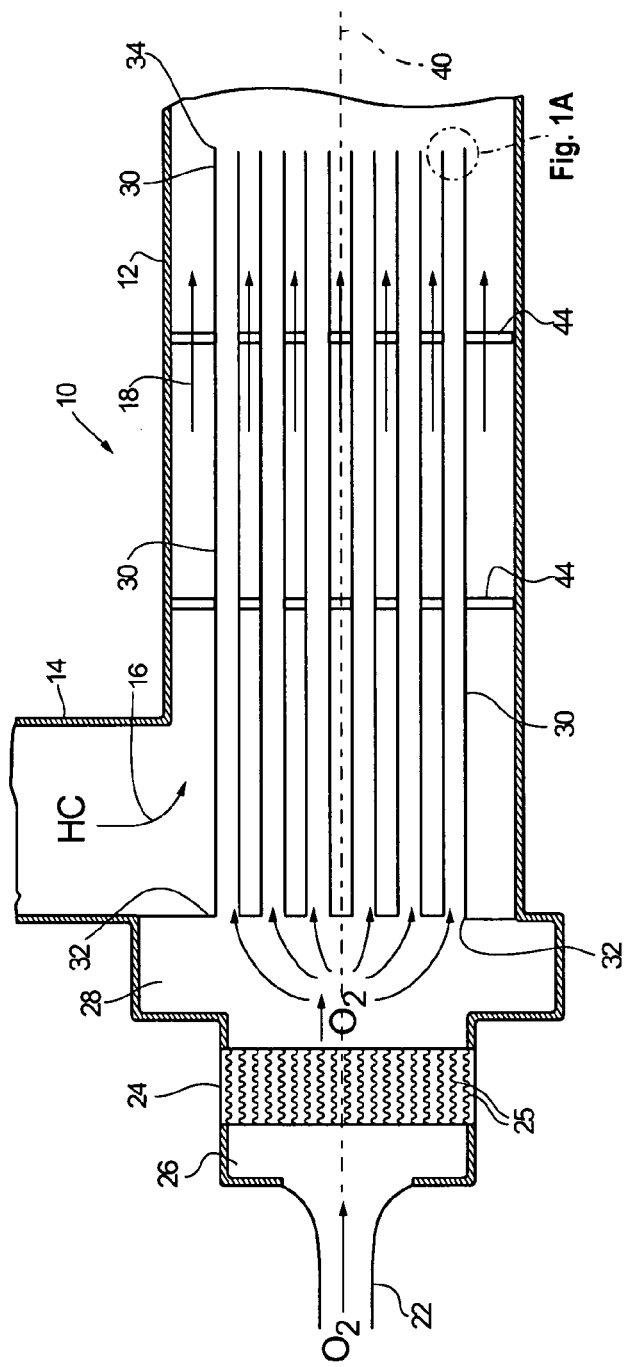
FIG. 1 is a schematic representation of an oxygen gas mixer featuring an impact labyrinth in the oxygen stream and elongate oxygen pipes positioned within a vessel containing a hydrocarbon-containing gas stream featuring a low shear design.

FIG. 1 is a schematic representation of a gas mixer 10 in accordance with one representative embodiment of this disclosure. The gas mixer features a main vessel or pipe 12 for carrying a hydrocarbon-containing gas stream. The vessel 12 has an inlet 14 for receiving a hydrocarbon-containing gas stream 16 from a source (not shown). The hydrocarbon-containing gas stream 16 flows through the inlet 14 and into the vessel 12. The flow of gas is shown by the arrows 18. The hydrocarbon-containing gas is mixed with oxygen-containing gas flowing out of oxygen fingers or pipes 30 at a mixing point or zone 20.

Figure 4:
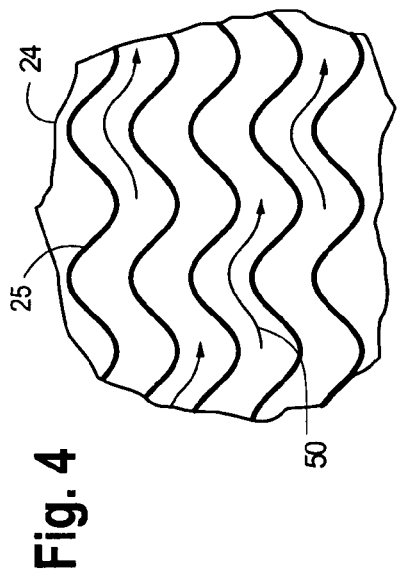
FIG. 4 is a detailed view of a portion of the labyrinth of FIGS. 1-3 showing the labyrinth featuring structures in the form of corrugated walls which define a tortuous path. The labyrinth is designed to promote impact of particles entrained in the oxygen gas stream.

The oxygen-containing gas (e.g., pure oxygen, oxygen enriched air, or air) is introduced into the gas mixer 10 via an inlet 22. The oxygen gas is supplied to a labyrinth 24 having an inlet 26. The labyrinth includes structures, such as an array of parallel corrugated walls 25 (shown in greater detail in FIG. 4) which define a tortuous path through which the oxygen gas stream must flow. The corrugated walls 25 are designed to foster impact of entrained particles within the oxygen gas stream. In particular, as shown in FIG. 4, the oxygen stream follows a winding path 50 between the parallel corrugated walls 25 and the momentum of any particles contained in the gas stream will carry such particles into the walls 25, producing impact and ignition (burning) of the particles. While FIG. 4 shows one possible construction of the labyrinth, other constructions are possible and no particular arrangement of walls or other structures within the labyrinth is considered to be particularly critical. The corrugated structures 25 are preferably made from a material such as carbon steel, stainless steel, and Hastelloy C which is designed to promote sparking and ignition of entrained particles. As will be appreciated by someone skilled in the art, the materials used in the labyrinth must follow industry guidelines on minimum thickness and maximum velocity to prevent ignition of the corrugated structures themselves.

The oxygen gas flows out of the labyrinth 24 into an oxygen gas manifold 28. The pipes 30 have one end 32 which is open to the manifold 28 and allows gas to enter the pipes 30.

Figure 1A:
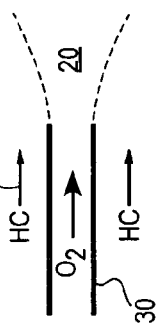
FIG. 1A is a detailed view of the end of the oxygen pipes of FIG. 1 showing the mixing zone where the gases are mixed.

The pipes have a sufficient length (e.g., 7 to 10 meters), and the oxygen flow velocity is sufficiently low, such that any particles surviving impact in the labyrinth 24 cool sufficiently by the time they exit the open opposite end 34 of the pipes 30 that ignition in the mixing zone 20 does not occur (see the detailed view FIG. 1A of the end of the oxygen pipe 30 and the mixing zone 20). Additionally, the pipes 30 are also preferably constructed and arranged such that they are substantially straight for the entire length between the ends 32 and 34, as shown in FIG. 1. This further minimizes the likelihood of an impact of a particle in the oxygen gas stream along the length of the pipe 30.

The outlet 34 of the pipes 30 are aligned with the flow direction of the hydrocarbon-containing gas stream 18 at the mixing zone 20, thereby minimizing shear of the hydrocarbon-containing gas stream and minimizing the likelihood of break-up of any entrained particles in the hydrocarbon-containing gas stream. In one embodiment, the vessel 12 includes a longitudinal axis 40 and the pipes 30 are all oriented parallel to the axis 40.

The gas mixer 10 may also include supports 44 supporting the pipes 30 within the vessel 10 to prevent vibration of the pipes 30. In some embodiments, supports 44 may be constructed of perforated plate, grid, screen, or other geometry to serve the dual purpose of supporting the tubes as well as straightening the hydrocarbon gas flow profile.

FIG. 2 is a schematic illustration of an alternative embodiment to gas mixer 10. The hydrocarbon-containing gas stream 16 is introduced on the side of the vessel 12 via an inlet 14. A flow straightener 42 is provided in the vessel 12 to provide for parallel flow of the hydrocarbon-containing gas stream. The oxygen gas stream is supplied via an inlet 22 to a labyrinth 24. The labyrinth 24 includes corrugated walls 25. The construction of the labyrinth 24 is basically the same as shown in FIGS. 1 and 4. The oxygen manifold 28 is positioned within the vessel 12. The pipes 30 have one end 32 connected to the manifold 28 and the opposite end 34 aligned with the flow direction 18 of the hydrocarbon-containing gas stream in the vessel 12.

Whereas in FIG. 1 the labyrinth 24 and oxygen manifold 28 are located coaxial with the axis 40 of the vessel 12, in FIG. 2 the oxygen gas stream is introduced from the side of the vessel. The configuration of FIG. 2 results in the pipes 30 being oriented perpendicular to the main length of the manifold 28, and the oxygen gas stream must makes a right angle turn to exit the manifold 28 and enter the pipes 30. In contrast, the design of FIG. 1 requires no such right angle turn. As the presence of the turn provides an additional possible place for particle impact to occur, the design of FIG. 1 may be preferred, particularly where no particle scrubbing or filtering of the oxygen gas stream is performed in the oxygen gas supply upstream of the labyrinth.

FIG. 3 is an illustration of another embodiment of a gas mixer 10. In the embodiment of FIG. 3 the oxygen gas inlet 22 and labyrinth are located coaxially within the vessel 12. Consequently, there is no right angle turn between the oxygen gas manifold 28 and the pipes 30. Furthermore, unlike the embodiments of FIGS. 1 and 2, there are no right angle turns in the hydrocarbon-containing gas stream in the gas mixer either. The labyrinth 24 and manifold 28 are shown supported within the walls of the vessel 12 by support brackets 46. Additionally, vibration of the oxygen pipes 30 is prevented by means of pipe supports 44. The gases mix in the mixing zone 20 proximate to the ends of the pipes 30.

Figure 5:
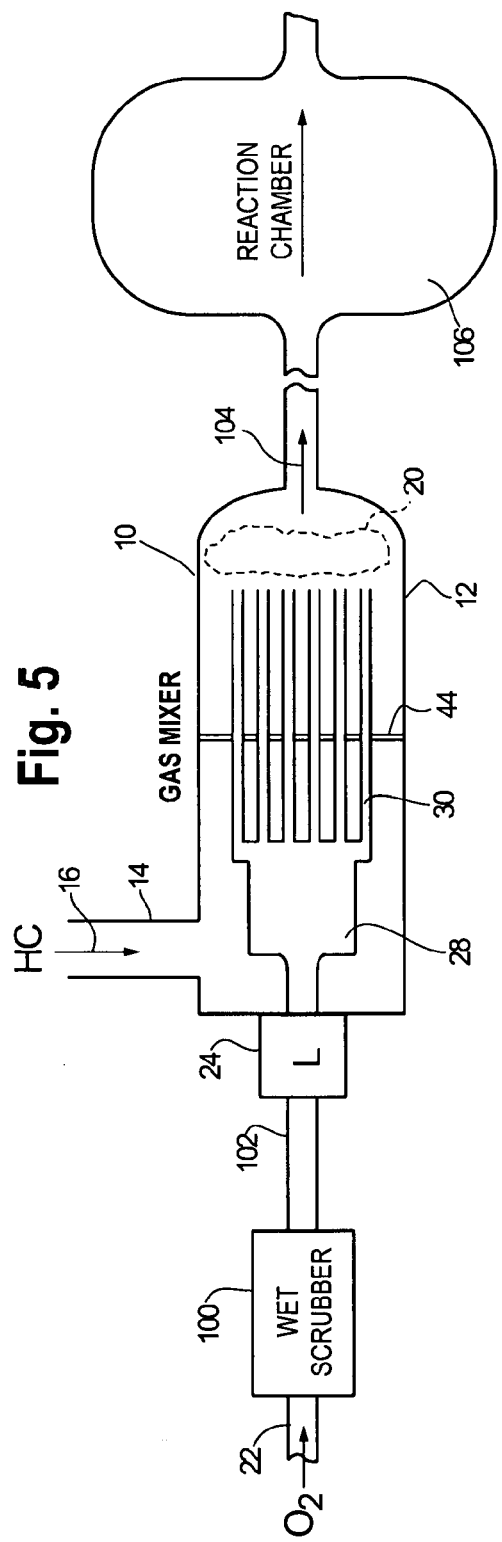
FIG. 5 is a schematic representation of a gas mixing system including the gas mixer of this disclosure, a wet scrubber in the oxygen gas stream upstream of the gas mixer, and a reaction chamber downstream of the gas mixer.

As noted, the gas mixers 10 of this disclosure can be used either alone or in combination with additional safeguards for minimizing the number and size of particles entering the gas mixer from the oxygen feed system. For example, the features of the gas mixers of FIGS. 1-4 design can be incorporated into a system which includes a subsystem upstream of the gas mixer 10 and labyrinth 24, such as filter or wet scrubber, to remove particles from the oxygen gas stream, or to filter the gas stream such that any particles entering the gas mixer are sufficiently small to burn and cool upstream of the gas mixing zone, i.e., within the labyrinth 24. FIG. 5 shows one possible configuration of such as system. An oxygen gas supply line 22 is connected to a source of oxygen gas and supplies the gas to a wet scrubber 100. The wet scrubber is designed to remove particles down to a particular size using any suitable wet scrubber technology known in the art. Various preferred wet scrubbing systems for a oxygen gas stream are described in WO 2009/078900, entitled "Wet Scrubbing For Removing Particulate Solids From Oxygen Supply Lines," the content of which is incorporated by reference herein. The outlet of the wet scrubber 100 is connected to a further supply pipe 102 which is preferably constructed from a corrosion-resistant material, such as Monel or stainless steel. The oxygen gas supplied along pipe 102 is fed to a labyrinth 24 and from there to an oxygen gas manifold 28 positioned within the gas mixer 10. The oxygen fingers 30 have one end receiving the oxygen gas stream from the manifold 28 and an open opposite (distal) end axially aligned with the flow of hydrocarbon-containing gas within the vessel 12. The gases mix at the mixing zone 20. Mixed gas is collected in the gas mixer 10 and fed via pipe 104 to a reaction chamber 106. The system shown in FIG. 5 features both the impact labyrinth 24 ("L") in the oxygen stream and elongate oxygen pipes 30 positioned within the vessel 12 containing a hydrocarbon-containing gas stream 16 featuring a low shear design.

Thus, from the above description, the embodiment of FIG. 5 uses the physical layout of the gas mixer 10, and optionally in conjunction with wet scrubbing of the oxygen stream for particle removal, and the use of corrosion-resistant materials of construction to reduce particle generation in the piping for the purpose of reducing the potential for an ignition when mixing oxygen with a hydrocarbon-containing gas. The gas mixer 10 injects oxygen co-axially with the flow of the hydrocarbon-containing gas stream to reduce the shear forces in the mixing zone 20 and extends the length of the oxygen pipes 30 within the gas mixer 10 as may be required to promote destruction and/or cooling of any particles entrained in the oxygen stream prior to its being mixed with the hydrocarbon-rich gas. Note further that in the disclosed embodiments the oxygen pipes 30 are straight for the entire length between the first end and the second end, minimizing the likelihood of energetic particle impacts. The design of the oxygen supply stream components are preferably such that the oxygen gas velocity is lowered to reduce mixing shear within the mixing zone 20. The system further features improved materials of construction to avoid corrosion derived particles in the hydrocarbon-containing gas stream.

The co-current mixing arrangement within the gas mixer in the mixing zone 20 eliminates recirculation zones at the oxygen pipe 30 outlets, which could promote growth of nascent flame kernels and subsequent flame stabilization, should hot particle breakthrough occur. Instead, a nascent flame kernel will be rapidly convected downstream towards the non-flammable (rich) zone of well-mixed gas, increasing the probability of flame extinguishment as opposed to flash-back. Furthermore, the design of the long, straight oxygen pipes 30 is such that any particles surviving the labyrinth do not experience energetic wall impacts near the oxygen pipe outlets. The low shear mixing as described above also reduces break-up of flakes or other particles which may be entrained in the hydrocarbon-containing gas stream.

In addition to reducing the probability of hot particle ignition, the gas mixer described herein, is suitable for retrofit in existing mixers such as described in the above-referenced prior art '534 patent, by incorporation of the labyrinth into the oxygen gas stream upstream of the oxygen gas manifold and oxygen fingers. As shown in FIGS. 1-3, several alternative layouts may be used. The preferred design features in-line entry of the oxygen such that the oxygen inlet is as far upstream as possible from the mixing zone and subsequent to the labyrinth there are no right-angled turns in the oxygen flow path (see FIGS. 1 and 3). Alternatively the oxygen may be introduced from the side (see FIG. 2). The preferred design features in-line entry of both the oxygen and hydrocarbon gas (FIG. 3). Alternatively, the hydrocarbon gas may be introduced from the side in order to accommodate retrofit needs (FIGS. 1, 2 and 5).

In some situations, particularly in relatively small EO production plants, plants devoted to production of EO derivative products, or plants with limited on-site storage capacity for finished product, it may be desirable to operate the EO production gas mixer of this disclosure in a high "turn-down" operating mode, in which the operating rate of the gas mixer is substantially reduced from its normal or designed operating rate. For example, a turn down rate of 90% is envisioned for the low shear mixers of this disclosure, i.e., one in which the plant operates at only 10% of its original design capacity. In such a mode, the oxygen gas feed rate is only 10% of its designed rate. Modification of the oxygen fingers may be made in a high turn down mode to provide for more oxygen gas injection points, and to increase the length of the gas mixer in the region downstream of the oxygen gas injection point(s) to allow for good mixing between the oxygen gas and the cycle gas. Further examples of high turn down modes of operation include operation of the EO gas mixer an operating rate of between 10 and 70 percent of the normal, designed operating rate (turn down rates of between 30 and 90 percent).

While presently preferred embodiments have been described with particularity, variation from the specifics of the disclosed embodiments may be made without departure from the scope of the invention. All questions concerning scope of the invention are to be determined by reference to the appended claims.

We claim:

1. A gas mixer for mixing a first gas stream with a second gas stream at a mixing point within the gas mixer, comprising:
   a) an impact labyrinth in the first gas stream, the impact labyrinth comprising structures forming a tortuous path through which the first gas stream must pass en route to the mixing point, the impact labyrinth fostering ignition of particles entrained in the first gas stream;
   b) a plurality of elongate pipes each having an opening, the plurality of elongate pipes receiving the first gas stream from the impact labyrinth and carrying the first gas stream to the mixing point, and
   c) a vessel carrying the second gas stream, the second gas stream having a flow direction,
   wherein the plurality of elongate pipes are positioned within the vessel and the openings of the plurality of elongate pipes are substantially aligned with the flow direction of the second gas stream at the mixing point.

2. The gas mixer of claim 1, wherein the vessel is in the form of a pipe having a longitudinal axis and wherein the plurality of elongate pipes and the openings of the plurality of elongate pipes are oriented in alignment with the longitudinal axis.

3. The gas mixer of claim 1, wherein the plurality of elongate pipes have a first end and a second end forming the opening and wherein the plurality of elongate pipes are straight for the entire length between the first end and the second end.

4. The gas mixer of claim 1, wherein the first gas stream comprises an oxygen-containing gas stream and wherein the second gas stream comprises a hydrocarbon-containing gas stream.

5. The gas mixer of claim 1, wherein the gas mixer further comprises an oxygen manifold connected to the labyrinth downstream of the labyrinth and wherein the plurality of elongate pipes have a first end connected to the oxygen manifold and a second end having an opening for introducing the oxygen-containing gas stream carried in the plurality of elongate pipes into the hydrocarbon gas stream at the mixing point.

6. The gas mixer of claim 1, wherein the plurality of elongate pipes are substantially straight for the entire length between the first end and the second end.

7. The gas mixer of claim 1, wherein the plurality of elongate pipes have a sufficient length such that particles ignited in the impact labyrinth substantially cool prior to arrival at the mixing point.

8. The gas mixer of claim 1, wherein the structures comprise an array of parallel corrugated structures arranged in alignment with the direction of flow of the oxygen-containing gas stream.

9. The gas mixer of claim 1, wherein the corrugated structures are made from a material selected from the group of materials consisting of carbon steel, stainless steel, and Hastelloy C.

10. A gas mixing system comprising the gas mixer as recited in claim 1 and further comprising a subsystem removing particles from the first gas stream upstream of the labyrinth.

11. The gas mixing system as recited in claim 10, wherein the subsystem comprises a wet scrubber.

12. The gas mixing system of claim 10, wherein the first gas stream comprises an oxygen-containing gas stream and the second gas stream comprises a hydrocarbon-containing gas stream.

13. The gas mixing system of claim 12, wherein the hydrocarbon-containing gas stream comprises a gas stream containing ethylene.

14. A method of mixing a hydrocarbon-containing gas stream with an oxygen-containing gas stream, comprising the steps of:
   supplying the oxygen-containing gas stream to an impact labyrinth comprising structures forming a tortuous path through which the oxygen-containing gas stream must pass to flow through the labyrinth, wherein the impact labyrinth fosters ignition of particles entrained in the oxygen-containing gas stream;
   flowing the oxygen-containing gas stream through the labyrinth;
   directing the oxygen-containing gas stream from the labyrinth into a plurality of pipes; and
   directing the oxygen-containing gas stream out of the pipes into the hydrocarbon-containing gas stream at a mixing point within a gas mixer.

15. The method of claim 14, wherein the oxygen-containing gas stream is introduced into the hydrocarbon-containing gas stream in a flow direction which is substantially aligned with a flow direction of the second gas stream at the mixing point.

16. The method of claim 14, further comprising the step of providing a manifold at an outlet of the labyrinth, the pipes have a first end connected to manifold and a second end forming an opening for directing the oxygen-containing gas stream out of the pipes, and wherein the pipes are substantially straight for the entire length between the first end and the second end.

17. The method of claim 14, further comprising the step of removing particles from the oxygen-containing gas stream upstream of the labyrinth.

18. The method of claim 17, wherein the step of removing particles is performed by a wet scrubber.

19. The method of claim 14, wherein the hydrocarbon-containing gas stream comprises a stream of gas containing ethylene.

* * * * *